INVENTOR:
LYLE J. BUTTERWORTH
BY
Roy Mattern Jr.
ATTORNEY

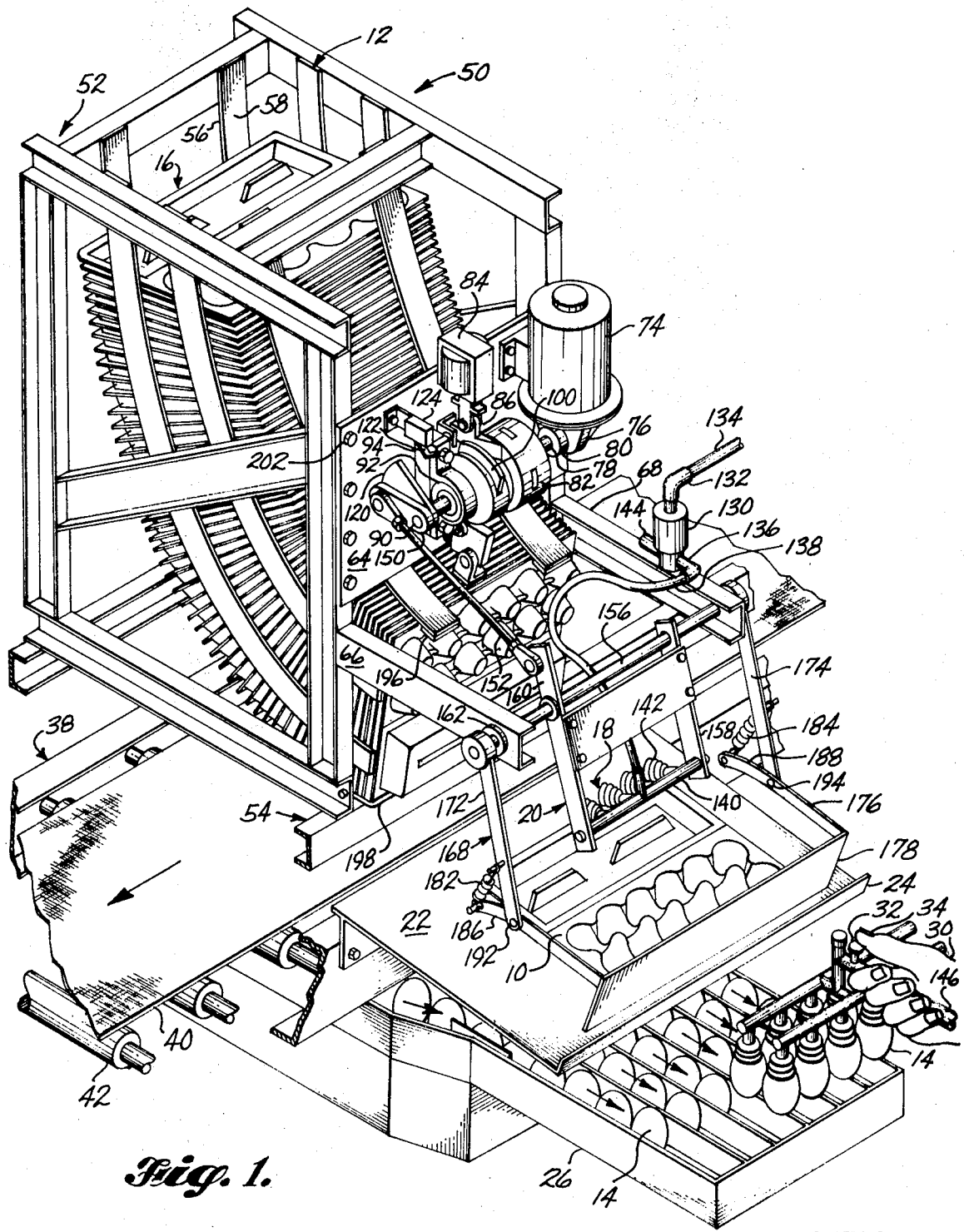

INVENTOR:
LYLE J. BUTTERWORTH
BY
Roy Mattern Jr.
ATTORNEY 3,606,960
EGG CARTON DISPENSING MACHINE
Lyle J. Butterworth, Tacoma, Wash., assignor to National Poultry Equipment Company, Benton, Wash., a division of Dawson & Co., Inc., Tacoma, Wash.
Filed Mar. 3, 1969, Ser. No. 803,777
Int. Cl. B65h 3/08
U.S. Cl. 221—211        6 Claims

ABSTRACT OF THE DISCLOSURE

For chicken flock owners and operators and others marketing eggs, who have a need for many automatic egg processing and handling products and accessories, an egg container dispenser and dispensing method are provided to rapidly position a carton, flat or other egg package on a tray or counter to be quickly filled with clean graded eggs. Egg containers, generally purchased and delivered in nestled stacks, are so placed in a dispenser and guided to a distribution location where they are stopped. When needed, the egg containers are conveniently released and pulled away from the nestled stack into their loading position, one at a time, by utilizing a cam operated indexing stack holding means and a cam timed vacuum container gripping means that is incorporated into a powered cam sequenced linkage means. Additional optional cam operated linkage moves a filled egg container to a distribution conveyor as another egg container is being released and separated from the nestled stack. At all times the vacuum gripping means and method are particularly suited to handling cartons made from plastic materials.

BACKGROUND OF THE INVENTION

Mechanical finger linkages are in use to separate egg containers. However, they are often destructive if the egg containers are somewhat delicate. Upon the introduction of egg containers made of plastic materials, many of these separating and positioning products and methods were found to be essentially limited to non plastic containers. Therefore, this dispenser and dispensing method were developed to handle plastic containers while being essentially always ready, with or without minor on the spot adjustments, to handle other containers such as those made of compressed paper fibers.

SUMMARY OF INVENTION

An egg carton dispenser is arranged and a method is followed to receive a stack of nestled cartons and position them one at a time on a given tray or counter space for filling and thereafter, optionally, to move them on to a delivery conveyor. During separation of one carton from the nestled group and its guidance to a filling position, vacuum gripping or holding means is essentially utilized to firmly grip to egg carton without damaging it. A completed cycle of handling an egg carton is accomplished preferably during operation of a set of cams rotating 360 degrees about powered shafts, aligned with one another, the cams controlling operations of a vacuum system, and a linkage system that is preferably also driven by the powered shafts.

DRAWINGS OF PREFERRED EMBODIMENT

FIG. 1 is a partial perspective view, with portions broken away, of a preferred embodiment of apparatus and other adjacent apparatus used in the vacuum method for separating egg containers from a stack and positioning them for loading;

DESCRIPTION OF PREFERRED METHOD

Figure 3:
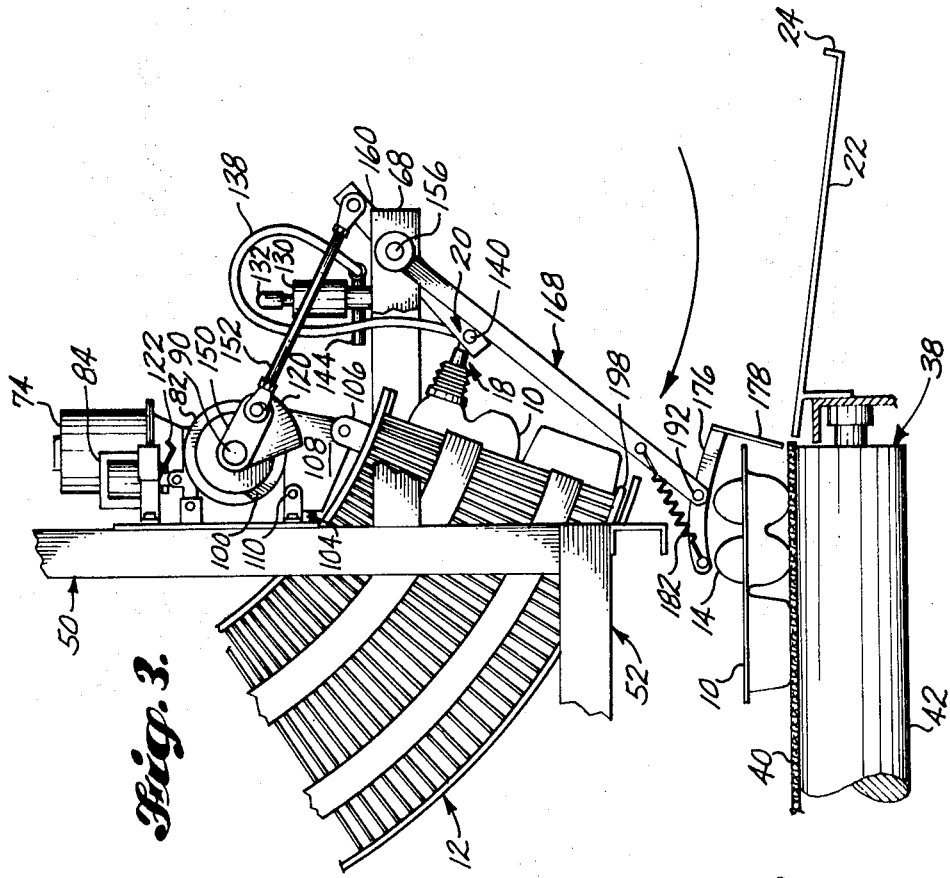
FIG. 3 is a partial side view, similar to FIG. 2, of some of the apparatus shown in FIG. 1, indicating commencement of vacuum gripping of the next available stacked and nestled egg carton as a filled egg carton is moved on to a delivery conveyor.

As illustrated throughout FIGS. 1 through 6, egg containers or cartons 10 of paper fibers are compressed or egg cartons 10 of plastic are vacuum formed into a configuration permitting their convenient minimum overall volume nestled storage 12 and handling before they are to be filled with eggs 14. Starting from this nestled stacked storage 12 of egg cartons 10, a preferred method of this invention, comprises the steps of: restraining a nestled stack 16 of cartons 10; releasing them one at a time; gripping the released carton 10 by employing a vacuum means 18; moving the vacuum gripped carton 10 away from the restrained stack 16 by employing a linkage means 20; lowering the vacuum gripped carton 10 to an egg loading place 22 having a limiting flange 24, by releasing the vacuum means 18; and optionally moving the filled carton 10 to a delivery conveyor, as another carton 10 is released and moved away from the restrained stack 16 by operation of vacuum means 18 and linkage means 20.

DESCRIPTION OF PREFERRED APPARATUS

General environment of an egg carton dispenser

An indicated in U.S. patent application Ser. No. 674,318 eggs are brought in from chicken houses (not shown) and lowered on to conveyors where they are candled, cleaned, sanitized, dried, graded and arranged for packaging. At the conclusion of their tour through such a machine, or other machines, graded eggs 14 are positioned and aligned as indicated in FIG. 1 in a preparatory packer 26, generally presenting six rows of eggs 14 in their respective upright positions.

From this position eggs 14 in groups sufficient to fill a carton 10 of a designated quantity, such as a one dozen size shown in FIG. 1, are lifted by employing a vacuum lift 28 held in hand 30. The dozen eggs 14 are moved over and into a carton 10 and then release valve 32 is thumb 34 depressed to deposit eggs 14 into carton 10 resting on a tray or counter 22.

Subsequently carton 10 of a dozen eggs is moved on to a delivery conveyor 38 employing a belt 40 and rollers 42, and subsequently after final inspection cartons 10 are closed and packed into larger containers, not shown, for delivery to market stores.

Figure 6:
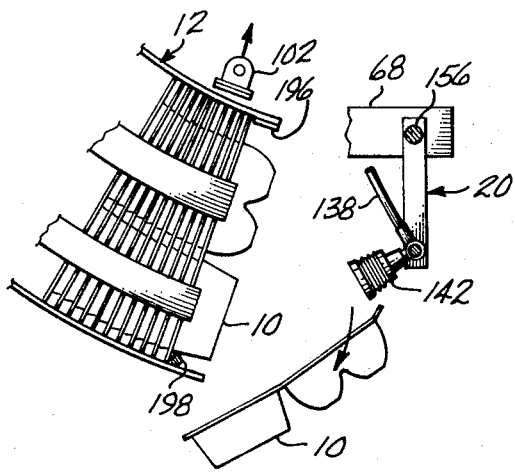
FIG. 6 is a partial side view, similar to FIGS. 4 and 5, to indicate how the egg carton drops upon its release from the vacuum gripping means.
Figure 7:
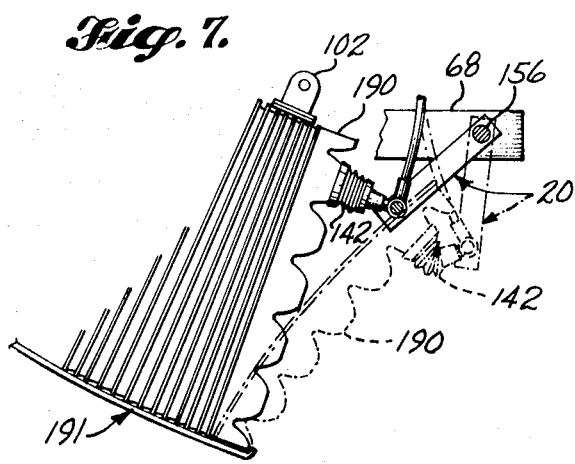
FIG. 7 is a partial side view, similar to FIG. 4 showing a different size egg container being handled by the vacuum gripping means as it is removed from a larger dispenser, dotted lines indicating subsequent separating positions.

The method and apparatus of this invention are directed to conveniently storing, restraining, delivering and positioning egg cartons 10 of a dozen size, as shown in FIGS. 1 through 6, or egg containers 190 of a greater size, as shown in FIG. 7, one by one in sequence to a loading place, counter or tray 22 for their filling in this general environment of egg processing apparatus. Thereafter, optionally, filled containers 10 or 190 are moved on to delivery conveyor 28. The method and apparatus are both based on vacuum gripping of a released container 10 or 190 during its removal from a nestled stack 16 and guidance to loading or filling place 22. The power and vacuum sources (not shown) associated with the other processing apparatus are preferably utilized in operating the overall carton dispenser and positioner 50.

Preferred active storage and guidance sub-assembly and dispensing nestled egg cartons As illustrated in FIG. 1, in this carton dispenser and positioner apparatus 50, an upright composite arrangement of framing members 52 are secured to overall framing 54 of the entire processing apparatus for cleaning, sanitizing and grading eggs 14. Within the space determined by framing members 52, several curved strips of metal 56, each faced with a plastic lamination 58, are spaced and arranged as a storage means 12. The curved strips 56 collectively receive stacked and nestled egg cartons 10 in their initially horizontal position and thereafter guide them individually, while so nestled in a stack 16, into their final vertical position as cartons 10 are added at the top and removed from below.

Preferred vacuum positioner sub-assembly removing egg cartons from the nestled stack 16 and positioning them on the filling tray or counter As illustrated in FIG. 1, a panelled mounting plate 64 is secured across framing 52 being preferably used as an integral part of such framing 52. Also secured to framing 52 below panelled mounting plate 64 are two spaced horizontal projecting mounting members 66 and 68 formed as channels. Arranged on and between panelled mounting plate 64 and spaced horizontal members 66 and 68 are assembled components designed to operate sequentially to release an egg carton 10, move it away under a vacuum grip from nestled stack 16, and lower it over carton filling tray or counter 22, and optionally move filled egg carton 10 on to delivery conveyor 38.

Powered drive shafts and timing mechanisms of vacuum positioner

An electrical motor 74, is vertically mounted on panel plate 64. Through a right angle drive 76 it turns shaft 78 in bearing 80 continuously, while electrical power remains turned on receiving electrical energy from a source (not shown) such as the 110 or 220 volt circuits of a building. Shaft 78 drives clutch assembly 82 having a solenoid 84 operated retractable side biasing wedge shaped latch 86. Upon its retraction a spring biased transverse clutching bar (not shown) moves to engage the clutch components and turn driven shaft 90 through one revolution. One revolution is all that occurs because latch 86 is only momentarily raised by solenoid 84 upon a finger depression of a button switch, not shown, that interrupts a controlling electrical circuit, not shown. During this one revolution of driven shaft 90, supported by clutch assembly 82 and bearing 92 that in turn is positioned out from panel 64 by bracket 94, the complete cycle of a release, removal and lowering of an egg carton 10 occurs.

Spring bias and cam controlled pressure foot holding egg cartons

Secured to shaft 90 is a release timing cam 100 which forces a spring biased pressure foot 102 down on the edges of egg cartons 10 nearing their release position at the lower terminus of nestled storage means 12. Cam 100 is formed to reduce the downward force allowing spring 104 to be effective in moving pressure foot 102 away from the edge carton edges as its pin 106 secured body 108 turns about its pivotal mounting pin 110. Such removal of pressure foot 102 occurs after an egg carton 10 has been withdrawn and when pressure foot 102 indexes it clamps down on egg carton edges adjacent to the edge of the next carton 10 to be withdrawn, leaving it free to be removed during the next cycle. A corrugated soft rubber pad 112 is secured to pressure foot 102 to create a firm but non crushing contact with the egg carton edges. Spring 104 is effectively centered and guided by fitting partially within a cylindrical recess in body 108.

Cam actuated switch to send electrical signal to three way vacuum control valve, releasing the vacuum once during the operating cycle of the driven shaft Vacuum release cam 120 is secured to driven shaft 90 to make contact with follower 122 of electrical switch 124. Operation of switch 124 causes a signal change in a circuit, not shown which supplies electrical energy to a three way vacuum valve 130, shown in FIG. 1, mounted on horizontal mounting member 68. A three way valve 130 is used to isolate this vacuum system branch from that branch serving the vacuum lift 28, when a common source vacuum pump, not shown, is operating.

At valve 130, fitting 132 is connected to a line 134 terminating at a vacuum pump, not shown. Fitting 136 is connected to a line 138 extending to a manifold 140 to which multiple vacuum cups 142 are secured. Fitting 144 is open to atmospheric pressure. Line 146 leaving vacuum lift 28 terminates at the vacuum pump, not shown.

Cam actuated linkage to move the manifold mounted vacuum cups into contact with the egg carton Vacuum release cam 120 is secured to or made integral with crank arm 150 which pivotally supports actuating rod 152. Movement of crank arm 150 and rod 152, during a cycle of driven shaft 90, is effective in causing movement of manifold 140 and vacuum cups 142. They are suspended below a transverse axle or shaft 156 by using a supporting frame 158 which firmly receives manifold 140 below, and shaft 156 above. One portion of frame 158 continues on beyond shaft 156 to serve as a crank arm 160 pivotally receiving the other end of actuating rod 152.

Movement of crank arm 150, actuating rod 152, and crank arm 160 causes supporting frames 158, manifold 140, vacuum cups 142, and shaft 156, all to rotate together. Shaft 156 is rotatably supported by bearing 162 secured in turn to spaced horizontal mounting members 66, and 68.

Figure 2:
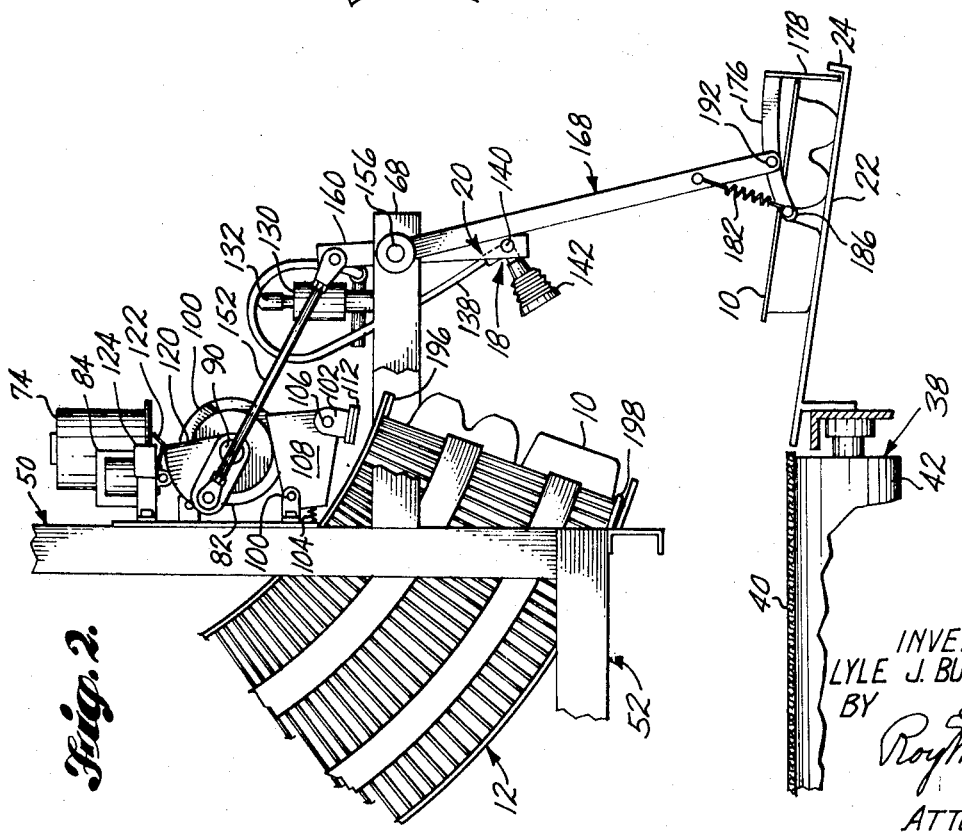
FIG. 2 is a partial side view of some of the apparatus shown in FIG. 1, indicating an egg loading position of an egg carton and a corresponding maximum clearance position of linkage supporting a vacuum application means.

During the one cycle revolution of driven shaft 90 linkage means 20 carrying vacuum means 18 moves back and forth through an arc indicated by observing FIGS. 2 and 3. Commencement of the cycle or its at rest or non-actuated position is as indicated as FIG. 2. However it could also be as indicated in FIG. 3, provided no obstruction was left in the way of cartons 10 filled with eggs 14 traveling on delivery conveyor 38 coming from other filling locations still being operated.

EGG FILLED CARTON GUIDING ACTUATOR LINKAGE MOVING CARTON TO THE DELIVERY CONVEYOR

Some persons filling cartons with eggs want freedom from as many obstructions as possible and also from precise timing of a loading cycle. If so no actuator linkage is provided, or if provided, it is easily removed. When not used, then stopping of a cycle may be as indicated in FIG. 3. However, generally there is a requirement to move an egg filled carton 10 on to delivery conveyor 38 in accordance with the timing of a complete cycle. This assures the clearance of filling or loading tray or counter 22 in time to receive an oncoming empty egg carton 10.

Therefore, an egg filled carton guiding actuator linkage 168 is installed firmly to extending ends of axle or shaft 156, which also is involved in movement of linkage means 20 moving vacuum means 18. Upon rotation of driven shaft 90, turning crank arm 150 and moving actuator rod 152, frame 158 and its crank arm extension 160 are pivoted turning shaft 156. During each cycle of driven shaft 90, then, shaft 156 is rotated partially in each rotative direction thereby sequencing movement of this filled carton actuator linkage 168 with movement of vacuum means 18 and its linkage means 20.

At each side of filled carton actuator linkage 168 are respective arms 172, 174 secured to shaft 156 and extending downwardly to serve as pivotal mountings for a pushing, dragging, or scraper frame 176 extending between arms 172, 174, across the lower portion of egg carton loading tray or counter 22. At the rear of pushing frame 176 is a somewhat flexible or resilient cross member 178 serving a contacting, pushing or dragging function moving filled carton 10 and assuring loading tray 22 will be clear for subsequent empty egg cartons arriving from vacuum means 18. Additional positioning control of cross member 178 and frame 176 is acquired by movements of coil springs 182, 184 anchored between arms 172, 174, a short distance above frame 176 and extending portions 186, 188 of frame 176, beyond pivotal frame mountings 192, 194. Such positioning control is needed as indicated in FIG. 3 because when a filled egg carton 10 reaches operating delivery conveyor 38, pushing frame 176 must be clear of eggs 14 and carton 10 which immediately are moved away.

MODIFICATIONS OF PREFERRED EMBODIMENT TO RECEIVE OTHER CONTAINERS, ETC.

As indicated in FIG. 7, a larger egg container 190 may be dispensed. Where different containers are to be handled by the same basic machine 50 its overall framing 52 surrounding nestled storage means 12 and such storage means itself is enlarged to a new size 191. Then spacing means, not shown, is used to quickly interchange nestled storage means 12, etc., to receive and guide empty egg containers 10, etc.

At the lower exit of storage means 12, etc. the top curved metal strips 65, etc. are furnished with semi-stopping corrugations and/or pads 196. Also across the bottom of the exit of storage means 12, etc., is an adjustable cross rod or bar 198 combining with pads 196 to serve as an adjustable restraining means to hold cartons 10. However, at all times, a cycled pressure foot 102 is relied upon to work in conjunction with adjustable bar 198 and vacuum means 18 is operated to pull away an exposed egg carton 10 for its positioning on loading or filling tray 22.

Other modifications such as constructing a filled carton pushing means to move a carton to one side to reach a conveyor moving in a different direction is undertaken, when necessary in a different overall machine environment. A delayed sequence timer is relied upon to automatically restart the operating cycle of driven shaft 90, relieving an attendant from the necessity of pressing an operational button controlling a starting switch.

SUMMARY OF OPERATIONAL ADVANTAGES OF THIS METHOD AND APPARATUS FOR SEPARATING EGG CONTAINERS FROM A STACK AND POSITIONING THEM FOR FILLING

Figure 4:
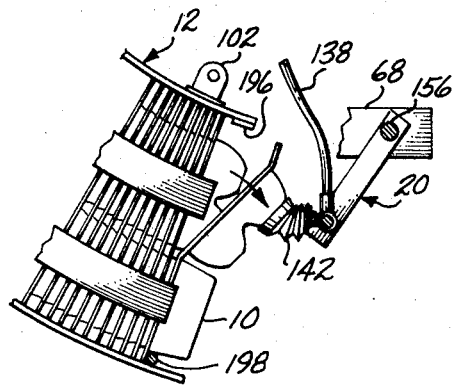
FIG. 4 is a partial side view, with portions broken away, to illustrate how an egg carton is pulled away by the vacuum gripping means and its associated linkage.
Figure 5:
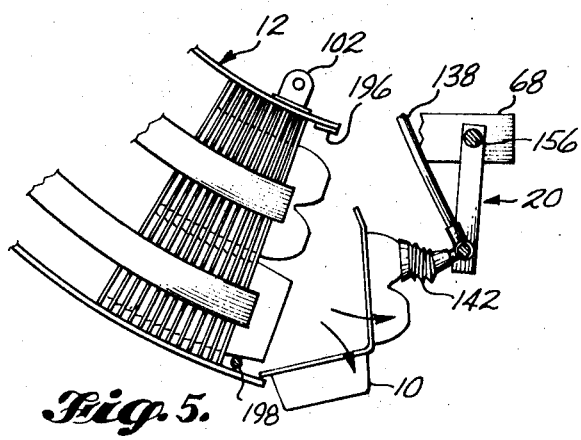
FIG. 5 is a partial side view, similar to FIG. 4, to illustrate further how the egg carton is pulled away by the vacuum gripping means and its associated linkage.

As indicated in FIG. 3, when a vacuum pump, not shown, is operating the next empty carton 10 is held captive by vacuum holding or gripping means 18 and pressure foot 102 has been indexed to hold other empty cartons 10. A cycling of driven shaft 90 may be undertaken at this moment upon an attendant's operation of a button switch, not shown, to control electrical energy operating solenoid 84 retracting a latch 86 thereby making the clutch effective in connecting driving shaft 78 to driven shaft 90. As rotation of driven shaft 90 continues, egg carton 10 is pulled free of pads 196, as illustrated in FIG. 4. Upon continued movement of driven shaft 90, linkage means 20 continues to swing vacuum means 18 away from nestled stack 16 resulting in clearing empty egg carton 10 from restraining bar 198 and in lowering it, with its right side about up, toward filling tray 22. Upon further swinging movement of vacuum means 18 and its linkage means 20, vacuum release cam 120 becomes effective initiating loss of vacuum and then empty egg carton 10 drops below, as depicted in FIG. 6.

Also sequenced at this approximate time, release timing cam 100 frees pressure foot 102 so its spring 104 is effective in clearing it from edges of empty egg cartons awaiting their cycled separation under vacuum, also as depicted in FIG. 6. When so freed of pressure foot 102, nestled stack 16 readjusts, moving other empty cartons 10 to be restrained by pads or corrugations 196 and adjustable cross rod or bar 198, while awaiting return of pressure foot 102. It does return prior to vacuum means 18 and linkage means 20 again becoming effective in pulling away the next exposed empty egg carton 10.

Whether or not this sequence is specifically followed, the overall apparatus 50 is used. In whatever embodiment it may be constructed and assembled, its operating purpose centers on the method of removing empty egg cartons 10, one by one, from a restrained nestled stack 16 using a vacuum means 18, employing, for example suction cups 142, to make a firm but gentle non-damaging contact with empty egg cartons 10. When separation occurs, restraints, such as pads 196 and rod or bar 188, free each empty egg carton without tearing it in any way. As a consequence, when more delicate materials are used in the manufacture of egg cartons, such as plastics that are vacuum formed into cartons 10, as illustrated in FIG. 1, this vacuum separation and placement method is extremely effective in quickly and accurately delivering cartons 10 to filling tray 22 without damaging them.

The apparatus, as illustrated and as described, is readily adjusted and modified to handle different sized egg containers and also containers made of different materials. Lineal, angular and/or radial adjustments are possible throughout the overall apparatus 50. Bolts 202 indicate lineal adjustment of the entire panel and its attachments are undertaken. The radial approach of suction cups 142, as an assembly by vacuum means 18, is undertaken by moving them on their manifold 140 to a different angular position relative to linkage means 20.

In summary, egg containers made of materials that provide essentially non porous portions of a light weight container are readily and quickly removed from a collective source, nestled or not, by providing a method and apparatus effectively utilizing a vacuum cycle of: contact; vacuum adherence; withdrawal under vacuum; interruption of vacuum; and clearance, allowing an empty egg carton 10 to be quickly separated from a stack 16, moved rapidly over a filling tray 22, and gently lowered away.

I claim:

1. Apparatus for separating egg containers from a nestled stack and positioning them for filling, comprising:
   (a) a framing means to be conveniently positioned near an egg container filling place;
   (b) a receiving and guiding means supported by the framing means to receive nestled egg containers;
   (c) restraining means on the exit of the receiving and guiding means to prevent the egg containers from passing directly through;
   (d) vacuum gripping means and its associated linkage means all pivotally secured to the framing means for pivotally moving the vacuum gripping means to and from the exit of the receiving and guiding means;
   (e) coordinated electro-mechanical means to move the vacuum gripping means into contact with an exposed egg container and to then return the vacuum gripping means with one egg container to a position clear of the exit of the receiving and guiding means where other egg containers remain under restraint and when so cleared to release the vacuum gripping means;
   (f) a filling tray means adjacent to the framing means and positioned below the coordinated electro-mechanical means to receive the separated container upon release of the vacuum gripping means; and
   (g) a pushing means interconnected with and positioned below the coordinated electromechanical means to move an egg filled separated container clear of the path of another oncoming vacuum separated empty egg container.

2. Apparatus for separating egg containers from a nestled stack and positioning them for filling, as claimed in claim 1, comprising in addition:
(a) an electrical energy source and circuits to be utilized by the electro-mechanical means;
(b) a vacuum source and supply lines including a three position valve changed by solenoid operations in the electrical circuitry for control and supply of vacuum to the vacuum gripping means; and
(c) an electrical motor to receive some of the electrical energy and operate a series of timing and actuator cams.

3. Apparatus for separating egg containers from a nestled stack and positioning them for filling as claimed in claim 2, comprising in addition: a clutch means in the coordinated electro-mechanical means to transmit driving power during a selected one revolution cycle and thereafter requiring another clutch actuation for a follow on one revolution cycle during which one empty egg container is separated from the stack of nestled egg containers.

4. Apparatus for separating egg containers from a nestled stack and positioning them for filling as claimed in claim 1, comprising in addition: a clutch means in the coordinated electro-mechanical means to transmit driving power during a selected one revolution cycle and thereafter requiring another clutch actuation for a follow on one revolution cycle during which one empty egg container is separated from the stack of nestled egg containers.

5. Apparatus for separating egg containers from a nestled stack and positioning them for filling, comprising:
(a) a framing means to be conveniently positioned near an egg container filling place;
(b) a receiving and guiding means supported by the framing means to receive nestled egg containers;
(c) restraining means on the exit of the receiving and guiding means to prevent the egg containers from passing directly through;
(d) vacuum gripping means and its associated linkage means all pivotally secured to the framing means for pivotally moving the vacuum gripping means to and from the exit of the receiving and guiding means;
(e) coordinated electro-mechanical means to move the vacuum gripping means into contact with an exposed egg container and to then return the vacuum gripping means with one egg container to a position clear of the exit of the receiving and guiding means where other egg containers remain under restraint and when so cleared to release the vacuum gripping means;
(f) an electrical energy source and circuits to be utilized by the electro-mechanical means;
(g) a vacuum source and supply lines including a three position valve changed by solenoid operations in the electrical circuitry for control and supply of vacuum to the vacuum gripping means; and
(h) an electrical motor to receive some of the electrical energy and operate a series of timing and actuator cams.

6. Apparatus for separating egg containers from a nestled stack and positioning them for filling, comprising:
(a) a framing means to be conveniently positioned near an egg container filling place;
(b) a receiving and guiding means supported by the framing means to receive nestled egg containers;
(c) restraining means on the exit of the receiving and guiding means to prevent the egg containers from passing directly through;
(d) vacuum gripping means and its associated linkage means all pivotally secured to the framing means for pivotally moving the vacuum gripping means to and from the exit of the receiving and guiding means;
(e) coordinated electro-mechanical means to move the vacuum gripping means into contact with an exposed egg container and to then return the vacuum gripping means with one egg container to a position clear of the exit of the receiving and guiding means where other egg containers remain under restraint and when so cleared to release the vacuum gripping means; and
(f) a clutch means in the coordinated electro-mechanical means to transmit driving power during a selected one revolution cycle and thereafter requiring another clutch actuation for a follow on one revolution cycle during which one empty egg container is separated from the stack of nestled egg containers.

References Cited
UNITED STATES PATENTS

| | | | |
|---|---|---|---|
| 2,894,361 | 7/1959 | Ullman et al. | 221—211X |
| 3,478,924 | 11/1969 | Comstock | 221—213 |

ROBERT B. REEVES, Primary Examiner

L. H. MARTIN, Assistant Examiner

U.S. Cl. X.R.

294—65; 221—41